United States Patent
Yang

(10) Patent No.: US 11,400,926 B2
(45) Date of Patent: Aug. 2, 2022

(54) ADAPTIVE OBJECT IN-PATH DETECTION MODEL FOR AUTOMATED OR SEMI-AUTOMATED VEHICLE OPERATION

(71) Applicant: Aptiv Technologies Limited, St. Michael (BB)

(72) Inventor: Mingda Yang, Rochester Hills, MI (US)

(73) Assignee: Aptiv Technologies Limited, St. Michael (BB)

( * ) Notice: Subject to any disclaimer, the term of this patent is extended or adjusted under 35 U.S.C. 154(b) by 327 days.

(21) Appl. No.: 16/712,189

(22) Filed: Dec. 12, 2019

(65) Prior Publication Data

US 2021/0179091 A1 Jun. 17, 2021

(51) Int. Cl.
*B60W 30/09* (2012.01)
*B60W 40/114* (2012.01)
*G08G 1/16* (2006.01)

(52) U.S. Cl.
CPC .......... *B60W 30/09* (2013.01); *B60W 40/114* (2013.01); *G08G 1/16* (2013.01); *B60W 2420/42* (2013.01); *B60W 2420/52* (2013.01); *B60W 2520/105* (2013.01); *B60W 2520/14* (2013.01); *B60W 2554/00* (2020.02); *B60W 2554/80* (2020.02); *B60W 2556/60* (2020.02)

(58) Field of Classification Search
CPC .............. B60W 30/09; B60W 40/114; B60W 2554/00; B60W 2554/80; B60W 2556/60; B60W 2420/42; B60W 2420/52; B60W 2520/105; B60W 2520/14; G08G 1/16
See application file for complete search history.

(56) References Cited

U.S. PATENT DOCUMENTS

| | | |
|---|---|---|
| 9,902,401 B2 | 2/2018 | Stein et al. |
| 2017/0297576 A1* | 10/2017 | Halder .................. G01C 21/34 |
| 2018/0052470 A1 | 2/2018 | Kim et al. |
| 2018/0174459 A1* | 6/2018 | Oh ........................ B60W 30/10 |
| 2018/0257660 A1 | 9/2018 | Ibrahim et al. |
| 2018/0281814 A1* | 10/2018 | Murray ............ B60W 30/0956 |
| 2019/0025853 A1* | 1/2019 | Julian .................. G05D 1/0274 |

FOREIGN PATENT DOCUMENTS

JP H07319541 A 12/1995

OTHER PUBLICATIONS

W. Kim, C. M. Kang, Y. S. Son, S. -H. Lee and C. C. Chung, "Vehicle Path Prediction Using Yaw Acceleration for Adaptive Cruise Control," in IEEE Transactions on Intelligent Transportation Systems, vol. 19, No. 12, pp. 3818-3829, Dec. 2018, doi: 10.1109/TITS.2018.2789482. (Year: 2018).*
Extended European Search Report for Application No. EP 20 20 8886 dated Apr. 30, 2021.

* cited by examiner

*Primary Examiner* — Aniss Chad
*Assistant Examiner* — Christine Nguyen Huynh
(74) *Attorney, Agent, or Firm* — Carlson, Gaskey & Olds, P.C.

(57) ABSTRACT

A method for operating an advanced driver assistance systems (ADAS) includes determining a distance between an object and a vehicle, selecting a path estimation methodology from multiple path estimation methodologies based at least in part on a distance between the vehicle and the object, and activating at least one ADAS action in response to determining that the object intersects the estimated path.

20 Claims, 2 Drawing Sheets

ADAPTIVE OBJECT IN-PATH DETECTION MODEL FOR AUTOMATED OR SEMI-AUTOMATED VEHICLE OPERATION

TECHNICAL FIELD

The present disclosure relates generally to computational models for determining if a detected object is in a vehicle path, and more specifically to a computational model configured to adapt the determination between at least two methods for estimating a vehicle path.

BACKGROUND

Semi-automated vehicles utilize sensor arrays including video cameras, speed sensors, road sensors and the like to assist a driver in control the operation of the vehicle. Included within this control is the pathing (determining the travel route) of the vehicle, the detection of objects within the path, and determining an appropriate response to the detection of one or more objects that are intersected by the estimated path. The decision process can be further complicated in semi-automated vehicles when the operator alters the path unexpectedly and/or the object may move unexpectedly.

Driver assistance semi-automated vehicle systems are referred to as advanced driver assistance systems (ADAS) and assist the driver in operating the vehicle. The object detection strategy for ADAS requires sufficiently accurate in-path detection in order to prevent collisions between the vehicle and any detected objects. Some existing ADAS are integrated with one or more vehicle sensors, and the data from the vehicle sensors is utilized to determine the expected path of the vehicle.

SUMMARY OF THE INVENTION

According to one example, a method for operating an advanced driver assistance systems (ADAS) includes determining a distance between an object and a vehicle, selecting a path estimation methodology from a plurality of path estimation methodologies based at least in part on a distance between the vehicle and the object, and activating at least one advanced driver assistance systems ADAS action in response to determining that the object intersects the estimated path.

In another example of the above method, selecting the path estimation methodology from the plurality of path estimation methodologies comprises comparing the determined distance to a distance threshold and selecting a first path estimation methodology in response to the determined distance being less than or equal to the distance threshold.

In another example of any of the above methods, the first path estimation methodology is a yaw rate only prediction methodology.

In another example of any of the above methods, selecting the path estimation methodology from the plurality of path estimation methodologies comprises comparing the determined distance to a distance threshold and selecting a second path estimation methodology in response to the determined distance being greater than the distance threshold.

In another example of any of the above methods, the second path estimation methodology estimates a vehicle path based on a combination of vehicle yaw rate and at least one of an additional sensor output and a vehicle location.

In another example of any of the above methods, the at least one of the additional sensor output and the vehicle location is the additional sensor output, and the additional sensor output comprises at least one of an output of a lane detection system, camera, radar/LIDAR, and GPS.

In another example of any of the above methods, the at least one of the additional sensor output and the vehicle location includes a geographic vehicle location.

In another example of any of the above methods, selecting the path estimation methodology from the plurality of path estimation methodologies based at least in part on the distance between the vehicle and the object includes selecting the path estimation methodology based at least in part on the distance between the vehicle and the object and on a rate of travel of at least one of the vehicle and the object.

In another example of any of the above methods, selecting the path estimation methodology from the plurality of path estimation methodologies comprises comparing the determined distance to a distance threshold with the distance threshold being a single threshold.

In another example of any of the above methods, selecting the path estimation methodology from the plurality of path estimation methodologies comprises comparing the determined distance to a distance threshold with the distance threshold being at least partially dependent upon a rate of speed of the vehicle.

In another example of any of the above methods, selecting the path estimation methodology from the plurality of path estimation methodologies comprises comparing the determined distance to a distance threshold with the distance threshold being at least partially dependent upon a rate of speed of the vehicle, as well as potentially the angle/rate of steering.

An exemplary vehicle controller includes a memory, a processor, and at least one input configured to receive sensor outputs from a plurality of sensors including a vehicle yaw sensor, at least one speed sensor and a plurality of cameras, and the memory stores an advanced driver assistance systems (ADAS) including an object detection system and a path estimation system, the ADAS being configured to select a path estimation methodology form a plurality of path estimation methodologies in response to the object detection system detecting an object, wherein the detection is based at least in part on a distance between the vehicle and the detected object.

In another example of the above vehicle controller, selecting the path estimation methodology from the plurality of path estimation methodologies comprises comparing the distance between the vehicle and the detected object to a distance threshold and selecting a first path estimation methodology in response to the determined distance being less than or equal to the distance threshold.

In another example of any of the above vehicle controllers, the first path estimation methodology is a yaw rate only prediction methodology.

In another example of any of the above vehicle controllers, selecting the path estimation methodology from the plurality of path estimation methodologies comprises comparing the distance between the vehicle and the detected object to a distance threshold and selecting a second path estimation methodology in response to the determined distance being greater than the distance threshold.

In another example of any of the above vehicle controllers, the second path estimation methodology estimates a vehicle path based on a combination of vehicle yaw rate and at least one of an additional sensor output and a vehicle location.

In another example of any of the above vehicle controllers, the ADAS further comprises an automated response system configured to enforce a corrective action in response to the detected object intersecting with the estimated path and the detected distance being less than a threshold.

In another example of any of the above vehicle controllers, the ADAS further comprises an automated response system configured to recommend a corrective action in response to the detected object intersecting with the estimated path and the detected distance being greater than a threshold.

An exemplary non-transitory computer readable medium stores instructions for causing a vehicle controller to determine a distance between an object and a vehicle, select a path estimation methodology from a plurality of path estimation methodologies based at least in part on a distance between the vehicle and the object, and activate at least one ADAS action in response to determining that the object intersects the estimated path.

In another example of the above computer readable medium, selecting the path estimation methodology from the plurality of path estimation methodologies comprises comparing the determined distance to a distance threshold and selecting a first path estimation methodology in response to the determined distance being less than or equal to the distance threshold.

These and other features of the present invention can be best understood from the following specification and drawings, the following of which is a brief description.

DETAILED DESCRIPTION

Figure 1:
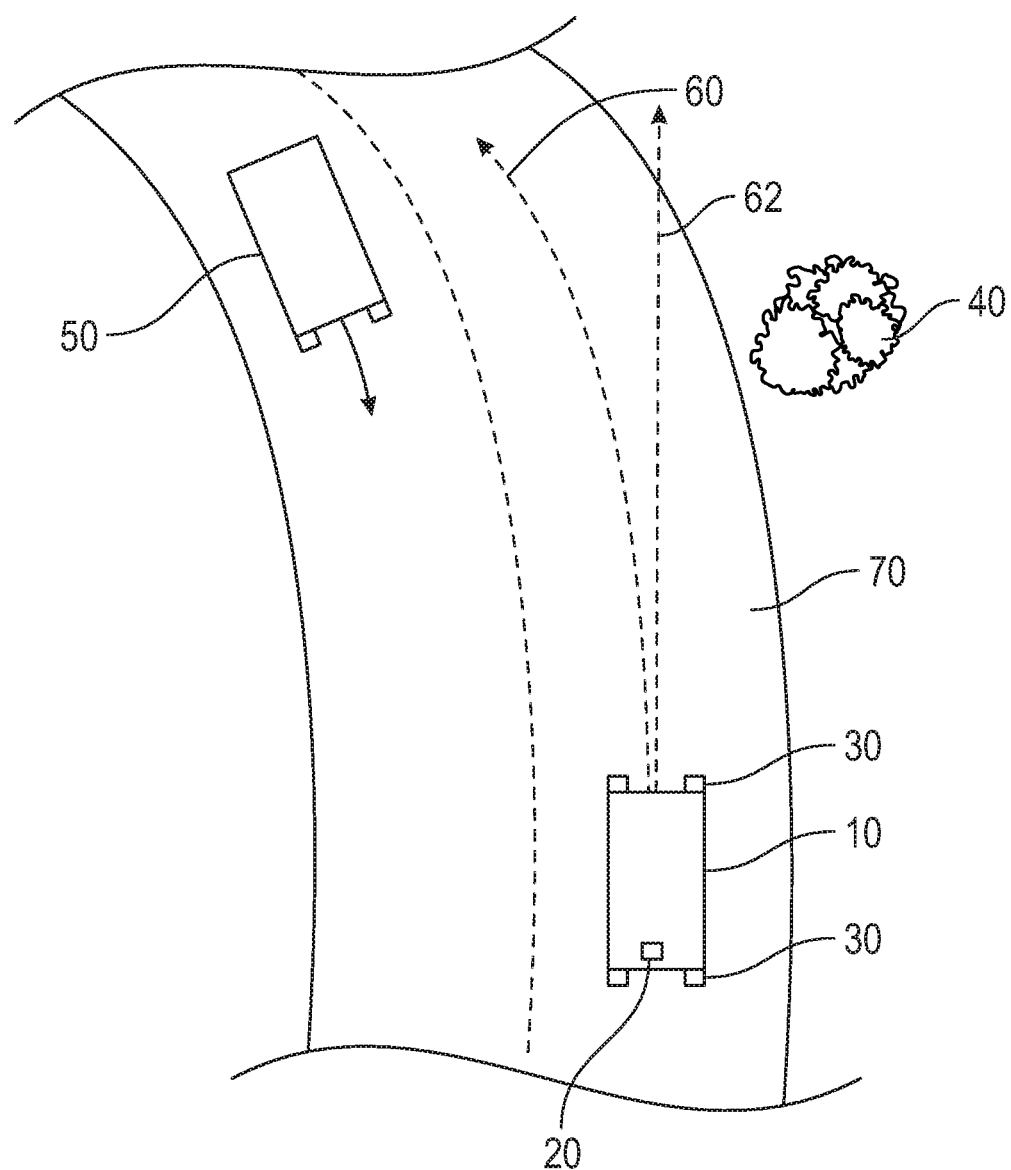
FIG. 1 illustrates an exemplary vehicle including an object detection system.

FIG. 1 schematically illustrates an exemplary vehicle 10 including an advanced driver assistance system (ADAS) 20. In some examples, the ADAS is a dedicated controller including a memory and a processor, with the memory storing instructions for operating the ADAS. In alternative examples, the ADAS is either a hardware or software component within a large engine controller, and the instructions for operating the ADAS are stored within the larger engine controller. The ADAS 20 is integrated with multiple sensors 30 disposed about the vehicle 10, and uses the sensor data to assist in operation of the vehicle 10. By way of example the sensors 30 can include lane detection systems, cameras, accelerometers, yaw sensors, and any similar type of sensor 30. The exemplary ADAS 20 includes one or more internal systems configured to identify the presence of objects, such as a tree 40 or approaching vehicle 50 in front of the vehicle 10. The object detection can be performed using any object detection methodology capable of detecting an object using the available sensors.

In addition to detecting the presence of an object in front of the vehicle 10, the ADAS 20 is tasked with determining whether an estimated path 60, 62 of the vehicle 10 will result in an intersection with the object 40, 50 or not. Based on the determination, the ADAS 20 can recommend or enforce corrective measures to avoid potential collision with the detected object 40, 50. The recommendation or enforcement of corrective measures is collectively referred to as an ADAS 20 action. By way of example, if the detected object 40, 50 is a stationary object, such as the tree 40, and the ADAS 20 determines that the current path 60, 62 will intersect with the tree 40, and collision is imminent, the ADAS 20 can either prompt the driver to turn (recommend a corrective measure) or apply the vehicles brakes (enforce a corrective measure) depending on the distance and speed difference between the vehicle 10 and the detected object 40, 50.

In order to improve the accuracy of the ADAS 20, the ADAS 20 includes methodologies for multiple distinct ways of estimating or predicting the path 60, 62 of the vehicle 10. Included in the multiple ways of estimating the path 60, 62 are methodologies that utilize only the yaw-rate of the vehicle 10, and methodologies that fuse data from one or more inputs from sensors 30 with a yaw-rate to determine the estimated path 60, 62. It is appreciated that other known or conventional path estimation methodologies can be utilized in place of, or alongside, the path estimation methodologies described herein. In such an example the ADAS 20 incorporates further decision matrices to determine which path estimation methodology to use, factoring in the particular strengths and weaknesses of each methodology.

Each methodology for determining the estimated path 60, 62 has corresponding strengths and weaknesses. By way of example only, it is appreciated that some yaw-rate only path predictions provide for a faster ADAS 20 response but are less reliable and less stable at mid to long range distances between the vehicle 10 and the object 40, 50 due to sensor accuracy and limits on yaw rate. Similarly, by way of example only, some sensor fused path predictions are more reliable at long range, but provide a slower response to any given driver action due to the consideration of the fused data. As used herein, a sensor fused methodology is any path prediction scheme that estimates a vehicle path 60, 62 based on distinct sensor inputs. By way of example, a lane detection sensor output can be fused with the yaw-rate to estimate a travel path 60, 62 of the vehicle 10. In other examples the sensor data fused to the yaw-rate data can include radar/LIDAR detection indicating the barrier of the road. In another example, the fused data can include a combination of the yaw rate and available map data indicating a direction of the road 70 on which the vehicle 10 is traveling, available GPS or other positioning system data indicative of a geographic positioning of the vehicle 10 (collectively referred to as a geographic vehicle location), or step by step direction data of the vehicle 10.

Figure 2:
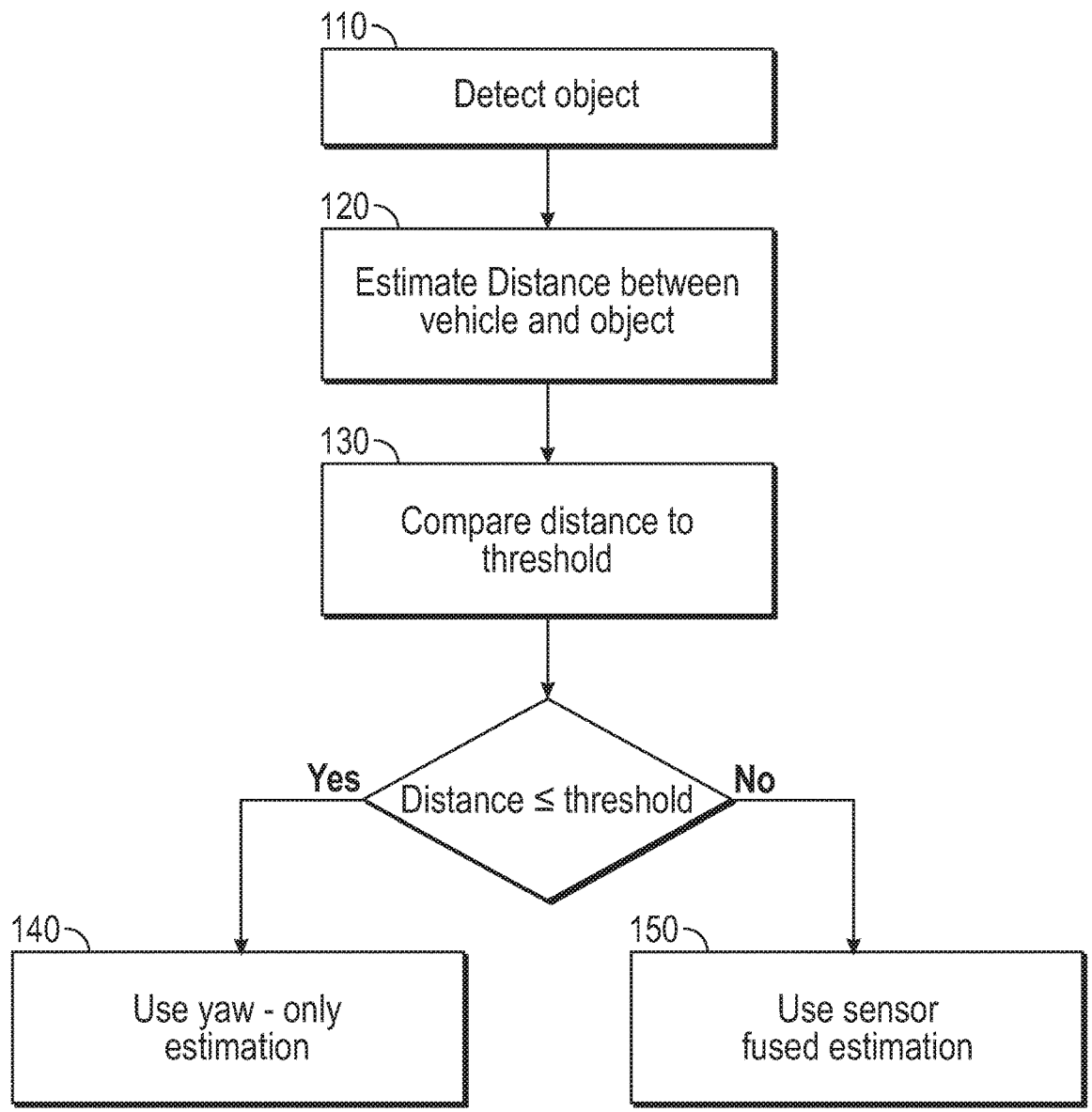
FIG. 2 illustrates an exemplary hybrid method for detecting when a target (detected object) is in a vehicle path.

With continued reference to FIG. 1, FIG. 2 schematically illustrates an exemplary method 100 by which the ADAS 20 determines which path prediction system, and thus which estimated path 60, 62, to utilize in detecting if a collision is imminent. Initially, the ADAS 20, or another vehicle system, detects an object 40, 50 forward of the vehicle in a "Detect Object" step 110. As used herein, "forward of the vehicle" refers to an object in the vehicles general direction of travel, and can include an object in the rear of the vehicle 10 when the vehicle 10 is traveling in reverse.

Once the object 40, 50 is detected, the ADAS 20 estimates a distance between the vehicle 10 and the object 40, 50, as well as a rate of approach between the vehicle 10 and the object 40, 50 in an "Estimate Distance Between Vehicle and Object" step 120. In alternative examples, the ADAS 20 only estimates the distance, and the rate of approach of the vehicle 10 is not considered in the determination process. In systems incorporating the rate of approach, the rate of approach can be approximated using a detected travel speed of the vehicle 10 or estimated based on a combination of the travel speed of the vehicle 10 and additional factors.

Once the distance has been determined, the determined distance is compared to a threshold distance in a "Compare Distance to Threshold" step 130. The threshold distance is, in one example, a predetermined distance at which the available response time allows the sensor fused path determination sufficient time to respond and the ADAS 20 to react. In such examples, the specific predetermined distance can be an empirically determined threshold set via laboratory testing and vehicle operation data from open world testing, and is stored within the vehicle 10 ADAS 20 in a look up table.

In alternative examples, such as those where the estimation step 120 also determines a rate of speed of the vehicle 10, the threshold distance can be adjusted further or closer depending on the rate of speed at which the vehicle 10 is traveling. This adjustment allows the ADAS 20 to compensate for a distance covered during an operators reaction time, as well as the ability of the vehicle 10 to respond to a given object detection scheme. In the alternative examples, the lookup table is more complicated and includes multiple thresholds with each threshold being dependent on other factors such as the travel speed of the vehicle 10.

In yet further examples, the particular threshold, or thresholds, utilized by the ADAS 20 to determine which path estimation methodology to utilize can be determined via a machine learning system trained using an empirical data set. In such an example the empirical data set includes actual vehicle operation data and can include open world testing, laboratory testing, and/or a combination of the two.

When the comparison to the threshold determines that the distance between the vehicle 10 and the object 40, 50 is less than or equal to the threshold, the ADAS 20 determines that the reliability of the yaw-only path estimation is sufficient and the decreased response time is needed, and the ADAS 20 uses the yaw-only estimated path 62 to determine an appropriate driver assistance response in a "User Yaw-Only Estimation" step 140. The driver assistance response in such a case can be warning indicators, automatic breaking, automatic swerving, or other collision avoidance techniques.

When the comparison to the threshold determines that the distance between the vehicle 10 and the object 40, 50 is greater than the threshold, the ADAS 20 determines that the decreased response time is unnecessary and the increased mid to long range reliability is desirable in a "Use Sensor Fused Estimation" step 150. The driver assistance response in such a case can include warning indicators, automatic braking, automatic swerving, or any similar corrective action.

While the exemplary ADAS 20 described herein includes two methodologies for determining the estimated path 60, 62, it is appreciated that the ADAS 20 can be expanded to include additional methodologies by one of skill in the art. In such an example, threshold windows are utilized to determine which of the multiple path estimation schemes should be utilized in any given situation.

Figure 3:
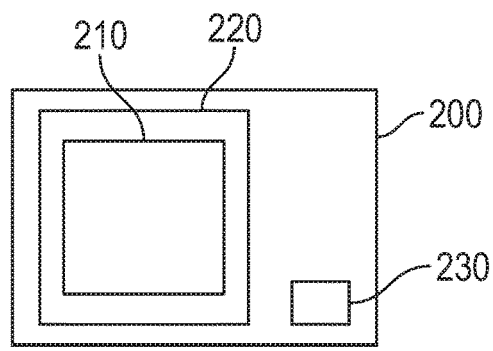
FIG. 3 illustrates an exemplary vehicle controller for implementing the method of FIG. 2.

In some examples, such as the example illustrated in FIG. 3 the ADAS 20 can be a software module 210 stored within a memory 220 of a controller 200 such as a vehicle controller. In such examples, the software module 210 is configured to cause a processor 230 in the controller 200 to perform the method described at FIG. 2.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for operating an advanced driver assistance systems (ADAS) comprising:
   determining a distance between an object and a vehicle;
   selecting a path estimation methodology from a plurality of path estimation methodologies based at least in part on a distance between the vehicle and the object, each of the path estimation methodologies being configured to estimate a path originating at the vehicle; and
   activating at least one advanced driver assistance systems ADAS action in response to determining that the object intersects the estimated path of the selected path estimation methodology.

2. The method of claim 1, wherein selecting the path estimation methodology from the plurality of path estimation methodologies comprises comparing the determined distance to a distance threshold and selecting a first path estimation methodology in response to the determined distance being less than or equal to the distance threshold.

3. The method of claim 2, wherein the first path estimation methodology is a yaw rate only prediction methodology.

4. The method of claim 1, wherein selecting the path estimation methodology from the plurality of path estimation methodologies comprises comparing the determined distance to a distance threshold and selecting a second path estimation methodology in response to the determined distance being greater than the distance threshold.

5. The method of claim 4, wherein the second path estimation methodology estimates a vehicle path based on a combination of vehicle yaw rate and at least one of an additional sensor output and a vehicle location.

6. The method of claim 5, wherein the at least one of the additional sensor output and the vehicle location is the additional sensor output, and the additional sensor output comprises at least one of an output of a lane detection system, camera, radar/LIDAR, and GPS.

7. The method of claim 5, wherein the at least one of the additional sensor output and the vehicle location includes a geographic vehicle location.

8. The method of claim 1, wherein selecting the path estimation methodology from the plurality of path estimation methodologies based at least in part on the distance between the vehicle and the object includes selecting the path estimation methodology based at least in part on the distance between the vehicle and the object and on a rate of travel of at least one of the vehicle and the object.

9. The method of claim 1, wherein selecting the path estimation methodology from the plurality of path estimation methodologies comprises comparing the determined distance to a distance threshold with the distance threshold being a single threshold.

10. The method of claim 1, wherein selecting the path estimation methodology from the plurality of path estimation methodologies comprises comparing the determined distance to a distance threshold with the distance threshold being at least partially dependent upon a rate of speed of the vehicle.

11. The method of claim 10, wherein selecting the path estimation methodology from the plurality of path estimation methodologies comprises comparing the determined distance to a distance threshold with the distance threshold being at least partially dependent upon a rate of speed of the vehicle, as well as potentially the angle/rate of steering.

12. A vehicle controller comprising:
a memory, a processor, and at least one input configured to receive sensor outputs from a plurality of sensors including a vehicle yaw sensor, at least one speed sensor and a plurality of cameras; and
the memory storing an advanced driver assistance systems (ADAS) including an object detection system and a path estimation system, the ADAS being configured to select a path estimation methodology from a plurality of path estimation methodologies in response to the object detection system detecting an object and estimating a path using the selected path estimation methodology, each of the path estimation methodologies being configured to estimate the corresponding path originating at the vehicle, wherein the detection is based at least in part on a distance between the vehicle and the detected object.

13. The vehicle controller of claim 12, wherein selecting the path estimation methodology from the plurality of path estimation methodologies comprises comparing the distance between the vehicle and the detected object to a distance threshold and selecting a first path estimation methodology in response to the determined distance being less than or equal to the distance threshold.

14. The vehicle controller of claim 13, wherein the first path estimation methodology is a yaw rate only prediction methodology.

15. The vehicle controller of claim 12, wherein selecting the path estimation methodology from the plurality of path estimation methodologies comprises comparing the distance between the vehicle and the detected object to a distance threshold and selecting a second path estimation methodology in response to the determined distance being greater than the distance threshold.

16. The vehicle controller of claim 15, wherein the second path estimation methodology estimates a vehicle path based on a combination of vehicle yaw rate and at least one of an additional sensor output and a vehicle location.

17. The vehicle controller of claim 12, wherein the ADAS further comprises an automated response system configured to enforce a corrective action in response to the detected object intersecting with the estimated path and the detected distance being less than a threshold.

18. The vehicle controller of claim 12, wherein the ADAS further comprises an automated-response system configured to recommend a corrective action in response to the detected object intersecting with the estimated path and the detected distance being greater than a threshold.

19. A non-transitory computer readable medium storing instruction for causing a vehicle controller to:
determine a distance between an object and a vehicle;
select a path estimation methodology from a plurality of path estimation methodologies based at least in part on a distance between the vehicle and the object each of the path estimation methodologies being configured to estimate a path originating at the vehicle; and
activate at least one ADAS action in response to determining that the object intersects the estimated path of the selected path estimation methodology.

20. The non-transitory computer readable medium of claim 19, wherein selecting the path estimation methodology from the plurality of path estimation methodologies comprises comparing the determined distance to a distance threshold and selecting a first path estimation methodology in response to the determined distance being less than or equal to the distance threshold.

* * * * *